H. EMBREE.

HACKSAW AND BROACHING MACHINE.

APPLICATION FILED SEPT. 9, 1918.

Reissued Oct. 29, 1918.

(1275883)

Re 14,542.

2 SHEETS—SHEET 1.

WITNESSES:

INVENTOR

Herbert Embree

BY

ATTORNEYS

THE HARRIS PETERS CO., PHOTO-LITHO., WASHINGTON, D. C.

H. EMBREE.

HACKSAW AND BROACHING MACHINE.

APPLICATION FILED SEPT. 9, 1918.

Reissued Oct. 29, 1918.

14,542.

2 SHEETS—SHEET 2.

WITNESSES:

INVENTOR

Herbert Embree

BY

ATTORNEYS

THE MORRIS PETERS CO., PHOTO-LITHO., WASHINGTON, D. C.

UNITED STATES PATENT OFFICE.

HERBERT EMBREE, OF HAMILTON, ONTARIO, CANADA, ASSIGNOR OF ONE-HALF TO WILFRED HUTCHINSON, OF HAMILTON, ONTARIO, CANADA.

HACKSAW AND BROACHING MACHINE.

14,542. Specification of Reissued Letters Patent. Reissued Oct. 29, 1918.

Original No. 1,275,883, dated August 13, 1918, Serial No. 194,030, filed September 29, 1917. Application for reissue filed September 9, 1918. Serial No. 253,339.

*To all whom it may concern:*

Be it known that I, HERBERT EMBREE, a subject of the King of Great Britain, residing at Hamilton, in the county of Wentworth and Province of Ontario, Canada, have invented a new and useful Improvement in Hacksaw and Broaching Machines, of which the following is a specification.

My invention relates to improvements in a combination hack-saw and broaching machine, and consists essentially of a suitable frame carrying a table slidable thereon, a vertically operating tool holding member, together with means for actuating the tool holding member and the table in conjunction each with the other, and novel means for adjusting and regulating the movement of the table in respect of the work being done.

The invention has for its object, to provide a machine of the class specified which will not only perform the function of a hack-saw more effectively than such machines used heretofore, but is also adapted for broaching, key-seating, dovetailing, gear cutting, and for performing other similar operations, with slight adjustments thereto.

A further object is to provide such a machine which will be simple, durable, efficient in operation, and comparatively inexpensive to manufacture.

These together with other objects which will become apparent to those skilled in the art, are attained by the construction, combination and arrangement of the parts as will hereinafter be more fully described, illustrated in the accompanying drawings, and pointed out in the claims hereunto appended.

Figure 1:
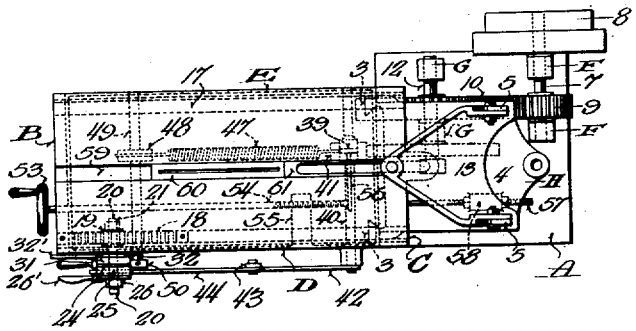
Figure 2:
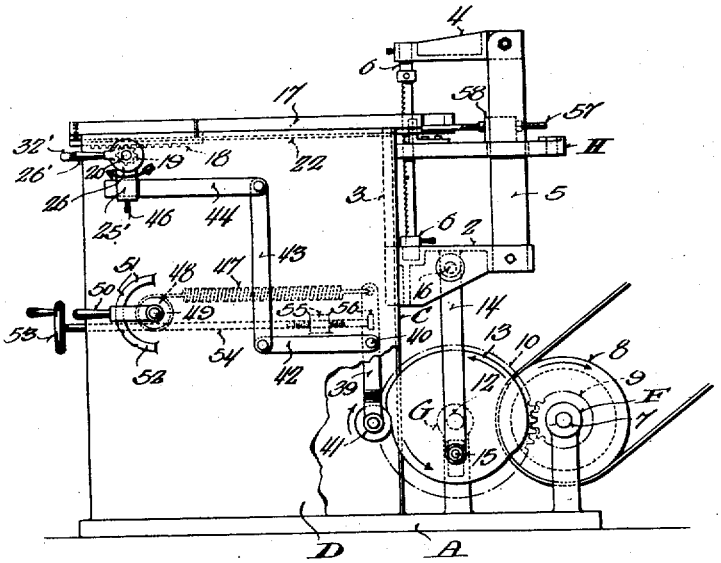
Figure 3:
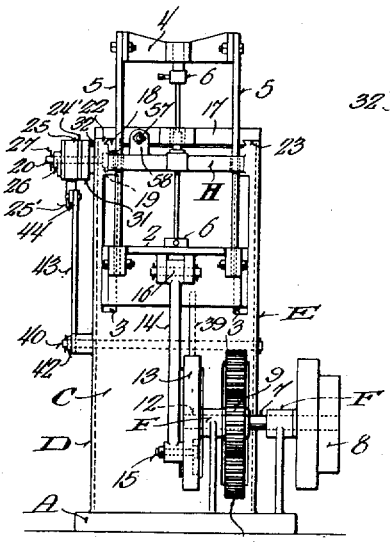
Figure 4:
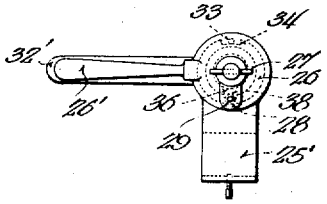
Figure 5:
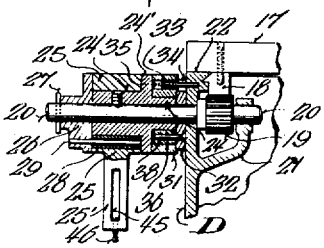
Figure 6:
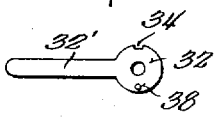
Figure 7:
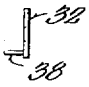
Figure 8:
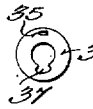
Figure 12:
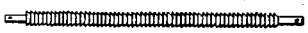

Reference being had to the accompanying drawing, in which similar reference characters refer to similar parts, Figure 1 is a plan view of the entire machine, Fig. 2 is a side elevation thereof, Fig. 3, a rear view, Fig. 4, an enlarged detailed side view of the clutch members constituting part of the table actuating mechanism, Fig. 5, a sectional rear elevation of Fig. 4, in connection with the table and frame, Figs. 6, 7, 8, 9, 10 and 11, detailed parts of the clutch which will as the description proceeds be fully explained with particular reference to the respective figures, and Fig. 12 shows a broaching tool which may be inserted in the tool holding member.

The bed-plate or base A, the front and rear walls B and C, respectively, and the lateral walls D and E, constitute the frame of the machine.

The base 2, vertically operative in tracks 3 in the rear wall of the frame, the top bracket 4 rigidly connected to the base 2 by the lateral strips 5, slidable through slots in the bracket 4, together with tool clamps 6 which are respectively secured to the bracket 4 and base 2, constitute the tool holding member. The bracket 4 is designed to support an arm for holding a key-seating tool.

A horizontal shaft 7 having bearing in journals F F rigid with the base A, carries a drive belt pulley 8, and a pinion 9 meshing with a gear 10 carried by a shaft 12 having bearing in journals G G, and carrying a cam 13. A connecting rod 14 journaled to the cam 13 at 15 and to the base 2, at 16, actuates the tool holding member.

A table 17, which is adapted to sustain a vise of any ordinary manufacture for the purpose of holding the article upon which the work is to be performed, is longitudinally slidable upon the frame and is provided on its under side with a rack 18 meshing with a pinion 19 rigid on a shaft 20 which has bearing in a portion of the wall D and in an integral bracket 21. The rack 18 is dovetailed into an integral portion 22 of the wall D which serves as a guide to the table 17. The opposite edge of the said table, which is of greater depth, is dovetailed into an integral part 23 of the wall E, which also guides the table.

Figure 9:
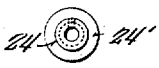
Figure 10:
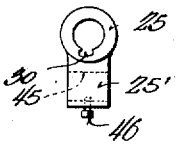
Figure 11:
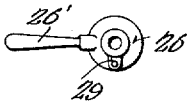

The portion of the shaft 20 exterior of the frame has rigidly secured to it a hub 24 shown in Fig. 9, and provided with an integral circumferential collar 24′ intermediate of its ends. A ring 25 having the same width as the outer portion of the hub 24, is sleeved thereon, and provided with an integral depending block 25′, and an end cap 26 provided with a grip 26′ is loosely mounted upon the end of the shaft 20 by means of a taper pin 27. A roller 28 sleeved on a pin 29 which is rigid with the cap 26, occupies an eccentric groove 30 in the ring 25. A ring 31, of the same width as the inner portion of the hub 24, is sleeved thereon, and a collar 32 provided with a grip 32′ is loose on the shaft 20, between the wall D and the hub and ring 24 and 31, respectively. A pin 33 rigid with the wall D, extends through a concentric groove 34 in the outer surface of the collar 32, and through a concentric slot 35 in the ring 31, and a roller 36 occupying an eccentric groove 37 in the ring 31, is sleeved on a pin 38 which is rigid with the collar 32.

A lever 39 rigid with a transverse horizontal shaft 40 having bearing in the lateral walls D and E of the frame, receives oscillatory motion imparted by the cam 13 which contacts with a roller 41 journaled to the lower-end part of said lever. An arm 42 rigid with the end of the shaft 40, exterior of the frame, is connected by means of a perpendicularly disposed link 43 to an arm 44 which is secured in a corresponding slot 45 in the block 25′ by a set screw 46.

The upper end part of the lever 39 is connected by means of a spiral pull spring 47 to a drum 48 rigid with a transverse horizontal shaft 49 having bearing in the lateral walls of the frame, and a lever 50 rigid with the shaft 49 exterior of the frame is adapted to engage one of a plurality of notches 51 in a segment 52 rigid with the frame.

The operation of the machine is as follows: The cam 13 actuated by the pinion and gear 9 and 10, operates the tool holding member, by the intermediary of the connecting rod 14, the down stroke active and the up stroke idle. In Fig. 2, the tool holding member is shown about to commence on its up stroke.

The cam 13 consists essentially of two equal halves, each being concentric, but one half having a greater radius than the other. During the up stroke of the tool the roller 41 travels in contact with the portion of the cam having the greater radius, and during the down stroke, with the portions having the lesser radius.

At the time of arrival of the tool at upper dead center, and the commencement of the down or active stroke, the roller 41 in act of departing from its position of contact with the portion of the cam having the greater radius, the said roller in its movement toward the drive shaft will permit the spring 47 to act, causing motion to be imparted to the lever 39, arms 42 and 44, link 43 and block 25. Motion of the spring transmitted to these parts will, in turn, cause the ring 25 to rotate in the direction indicated by the arrow, Fig. 2. The initial action of the ring causes its eccentric groove 30 to force the roller 28 into frictional engagement with the hub 24, whereby the said ring and hub are locked together. Thereafter to complete this stroke the spring will exert its pressure upon the clutch shaft 20 so as to cause said shaft and its pinion 19 to impel the work table 17 forward or toward the tool, exerting at all times a yielding pressure of the work against the cutting teeth of the tool until the cutting stroke is completed. The table is tensioned by the spring 47, and consequently the work is retained in tensioned contact with the tool, the drum 48, together with its operative means being to determine the force of the said tension in respect of the work being done.

To complete the cycle of the operation, at the time of arrival of the tool at bottom dead center, and the commencement of the up or idle stroke, the roller 41 in act of departing from its position of contact with the portion of the cam having the lesser radius, permits the work to just disengage the tool, but no more. This action of the clutch under control of the cam to disengage the work causes the ring 25 and its block 25′ to move in the reverse direction whereby the roller 28 will free the hub 24 from its engagement with the ring 25, it being understood that the roller 28 has play upon its pin. When the reverse movement of the clutch ring 25 takes place, the clutch mechanism comprising the ring 31, collar 32, together with its associated cam-groove and roller, permits a slight freedom of movement of the table 17 but locks the same against overthrow. In other words, the clutch mechanism just referred to locks the shaft 20 in its forward step by step feed, but permits the table to recede slightly, in order to clear the tool from the cut during its idle stroke.

The handles 26′ and 32′ on the rings 26 and 32, respectively, are for the purpose of disengaging the work from the tool during the active stroke thereof, in case of arising circumstances.

A hand wheel 53 rigid on a longitudinal horizontal shaft 54 having bearing in the forward wall B of the frame and threaded through a bracket 55 integrally extended from the lateral wall D of the frame, engages a boss 56 on the lever 39 above its shaft 40. By rotating this hand wheel to the right, in the case of a right hand thread on the shaft 54, the roller 41 of the lever 39 is adjusted to such a position as not to engage the portion of the cam 13 having the lesser radius, but to engage only the portion thereof having the greater radius. By this means the forward feed movement of the table 17 may be determined and regulated in respect of the nature of the work being performed.

A rod 57 threaded through a boss 58 integral with the bracket 4 serves as an adjustable stop for the table 17.

The table 17 is provided with a central longitudinal dovetail groove 59 for the insertion of slides 60 and 61, which are slotted according to the tool being used. The slide 60 is shown slotted for a hack-saw, and the slide 61 for a broaching tool such as that shown by Fig. 12.

What is claimed is:

1. A machine of the character described including a frame, a work supporting table reciprocatively carried by the frame, a tool holder carried by the frame for reciprocation transversely of the work table, a drive means for reciprocating the tool holder, means for procuring yieldable pressure to feed the work table toward the tool holder including a clutch connection with the work table permitting free movement of the work table away from the tool holder upon relief of the feed pressure, and means operable during alternate strokes of the tool holder for relieving the table of said yieldable feeding pressure.

2. In a machine of the class described, the combination with a frame, of a cam rotatable in the frame and actuating means therefor, a vertically operative tool holder slidable in the frame, a connecting rod journaled one end to the tool holder and the opposite end to the cam, a table slidable on the frame and adapted to maintain means for holding the work and actuated from the cam in such manner as to position the work in contact with the tool during the active stroke of the tool holder and to disengage the work therefrom during the idle stroke, and means for tensioring the work against the tool.

3. In a machine of the class described the combination with a frame, of a cam rotatable in the frame and actuating means therefor, a vertically operative tool holder slidable in the frame and actuated from the cam, a table slidable on the frame with means for holding work thereon, a rack secured to the table, a shaft having bearing in the frame, a pinion rigid on the shaft and meshed with said rack, a hub rigid on said shaft, rings loose on the hub and provided each with an eccentric groove in its core, rollers occupying said grooves, a block integral with one of the rings, an arm carried by the block, and means connected to said arm and actuated by said cam, as and for the purpose set forth.

4. In a machine of the class described, the combination with a frame, of a cam rotatable in the frame and actuating means therefor, a vertically operative tool holder slidable in the frame and actuated from the cam, a table slidable on the frame with means for holding the work thereon, a rack secured to the table, a shaft having bearing in the frame and carrying a pinion meshed with the rack, a hub rigid on the shaft, rings loose on said hub and provided each with an eccentric groove in its core, an end cap loose on said shaft adjacent to the hub and to one of said rings and provided with a pin extending into the groove in the adjacent ring, a collar loose on said shaft adjacent to the opposite end of said hub and to the other ring and provided with a pin extending into the groove in the adjacent ring, rollers sleeved one on each said pin and occupying the grooves in said rings, a block integral with one of said rings, an arm carried by and rigid with said block, and means connected to said arm and actuated by said cam, as and for the purpose set forth.

5. In a machine of the class described, the combination with a frame, of a cam rotatable in the frame and actuating means therefor, a vertically operative tool holder slidable in the frame and actuated from the cam, a table slidable on the frame with means for holding work thereon, a rack secured to the table, a shaft having bearing in the frame and carrying a pinion meshed with the rack, a hub rigid on the shaft, rings loose on said hub and provided each with an eccentric groove in its core, an end cap loose on said shaft adjacent to the hub and to one of said rings and provided with a pin extending into the groove in the adjacent ring, a collar loose on said shaft adjacent to the opposite end of said hub and to the other ring and provided with a pin extending into the groove in the adjacent ring, rollers sleeved one on each said pin and occupying the grooves in said rings, a slot in one of said rings, a pin rigid with the frame and extending into said slot, a block integral with one of said rings, an arm carried by and rigid with said block, and means connected to said arm and actuated by said cam, as and for the purpose set forth.

6. In a machine of the class described, the combination with a frame, of a cam rotatable in the frame and actuating means therefor, a vertically operative tool holder slidable in the frame and actuated from the cam, a table slidable on the frame with means for holding work thereon, a rack secured to the table, a shaft having bearing in the frame and carrying a pinion meshed with the rack, a hub rigid on the shaft, rings loose on said hub and provided each with an eccentric groove in its core, an end cap loose on said shaft adjacent to the hub and to one of said rings and provided with a pin extending into the groove in the adjacent ring, a collar loose on said shaft adjacent to the opposite end of said hub and to the other ring and provided with a pin extending into the groove in the adjacent ring, rollers sleeved one on each said pin and occupying the grooves in said rings, a slot in one of said rings, a pin rigid with the frame and extending into said slot, a handle rigid with said end cap, a handle rigid with said collar, a block integral with one of said rings, an arm carried by and rigid with said block, and means connected to said arm and actuated by said cam, as and for the purpose set forth.

7. In a machine of the class described, the combination with a frame, of a cam rotatable in the frame and actuating means therefor, a vertically operative tool holder slidable in the frame and actuated from the cam, a table slidable on the frame with means for holding work thereon, a rack secured to the table, a shaft having bearing in the frame and carrying a pinion meshed with the rack, a hub rigid on the shaft, rings loose on said hub and provided each with an eccentric groove in its core, an end cap loose on said shaft adjacent to the hub and to one of said rings and provided with a pin extending into the groove in the adjacent ring, a collar loose on said shaft adjacent to the opposite end of said hub and to the other ring and provided with a pin extending into the groove in the adjacent ring, rollers sleeved one on each said pin and occupying the grooves in said rings, a slot in one of said rings, a pin rigid with the frame and extending into said slot, a handle rigid with said end cap, a handle rigid with said collar, a block integral with one of said rings, an arm carried by and rigid with said block, and means connected to said arm and actuated by said cam, said latter means comprising a second shaft having bearing in the frame, a lever rigidly secured intermediate of its ends to the second shaft, a roller journaled to one end of the lever and engaging said cam, an arm rigid with the second shaft, and a link connecting said arm with the arm carried by said block.

8. In a machine of the class described, the combination with a frame, of a cam rotatable in the frame and actuating means therefor, a vertically operative tool holder slidable in the frame and actuated from the cam, a table slidable on the frame with means for holding work thereon, a rack secured to the table, a shaft having bearing in the frame and carrying a pinion meshed with the rack, a hub rigid on the shaft, rings loose on said hub and provided each with an eccentric groove in its core, an end cap loose on said shaft adjacent to the hub and to one of said rings and provided with a pin extending into the groove in the adjacent ring, a collar loose on said shaft adjacent to the opposite end of said hub and to the other ring and provided with a pin extending into the groove in the adjacent ring, rollers sleeved one on each said pin and occupying the grooves in said ring, a slot in one of said rings, a pin rigid with the frame and extending into said slot, a handle rigid with said end cap, a handle rigid with said collar, a block integral with one of said rings, an arm carried by and rigid with said block, and means connected to said arm and actuated by said cam, said latter means comprising a second shaft having bearing in the frame, a lever rigidly secured intermediate of its ends to the second shaft, a roller journaled to one end of the lever and engaging said cam, an arm rigid with the second shaft, and a link connecting said arm with the arm carried by said block, a spring connecting the opposite end of said lever with a drum having bearing in the frame, and means for actuating the drum, for the purpose specified.

9. In a machine of the class described, the combination with a frame, of a cam rotatable in the frame and actuating means therefor, a vertically operative tool holder slidable in the frame and actuated from the cam, a table slidable on the frame with means for holding work thereon, a rack secured to the table, a shaft having bearing in the frame and carrying a pinion meshed with the rack, a hub rigid on the shaft, rings loose on said hub and provided each with an eccentric groove in its core, an end cap loose on said shaft adjacent to the hub and to one end of said rings and provided with a pin extending into the groove in the adjacent ring, a collar loose on said shaft adjacent to the opposite end of said hub and to the other ring and provided with a pin extending into the groove in the adjacent ring, rollers sleeved one on each said pin and occupying the grooves in said rings, a slot in one of said rings, a pin rigid with the frame and extending into said slot, a handle rigid with said end cap, a handle rigid with said collar, a block integral with one of said rings, an arm carried by and rigid with said block, and means connected to said arm and actuated by said cam, said latter means comprising a second shaft having bearing in the frame, a lever rigidly secured intermediate of its ends to the second shaft, a roller journaled to one end of the lever and engaging said cam, an arm rigid with the second shaft, and a link connecting said arm with the arm carried by said block, a spring connecting the opposite end of said lever with a drum having bearing in the frame, and means for actuating the drum, a third shaft having bearing in the frame and threaded through a bracket therein, and carrying actuating means on one end thereof, the opposite end engaging an integral part of said lever, as and for the purpose set forth.

10. In a machine of the class described, the combination with a frame of a cam rotatable in the frame and actuating means therefor, a vertically operative tool holder slidable in the frame and actuated from the cam, a table slidable on the frame with means for holding work thereon, a rack secured to the table, a shaft having bearing in the frame and carrying a pinion meshed with the rack, a hub rigid on the shaft, rings loose on said hub and provided each with an eccentric groove in its core, and one with a slot, an end cap loose on said shaft adjacent to the hub and to one of said rings and provided with a pin extending into the groove in the adjacent ring, a collar loose on said shaft adjacent to the opposite end of said hub and to the other ring and provided with a pin extending into the groove in the adjacent ring, rollers sleeved one on each said pin and occupying the grooves in said rings, a pin rigid with the frame and extending into said slot, a handle rigid with said end cap, a handle rigid with said collar, a block integral with one of said rings, an arm carried by and rigid with said block, and means connected to said arm and actuated by said cam, said latter means comprising a second shaft having bearing in the frame, a lever rigidly secured intermediate of its ends to the second shaft, a roller journaled to one end of the lever and engaging said cam, an arm rigid with the second shaft, and a link connecting said arm with the arm carried by said block, a drum having bearing in the frame, a spring connecting the opposite end of said lever with said drum, and means for actuating the drum, a third shaft having bearing in the frame and threaded through a bracket therein, and carrying actuating means on one end thereof, the opposite end engaging an integral part of said lever, a bracket secured to the rear of the frame and adapted to carry an arm for holding a key-seating tool, a rod threaded through an integral boss on said bracket, as and for the purpose specified.

11. In a machine of the class described, the combination with a frame, of a cam rotatable in the frame and actuating means therefor, a vertically operative tool holder slidable in the frame and actuated from the cam, a table slidable on the frame with means for holding work thereon, a rack secured to the table, a shaft having bearing in the frame and carrying a pinion meshed with the rack, a hub rigid on the shaft, rings loose on said hub and provided each with an eccentric groove in its core, an end cap loose on said shaft adjacent to the hub and to one of said rings and provided with a pin extending into the groove in the adjacent ring, a collar loose on said shaft adjacent to the opposite end of said hub and to the other ring and provided with a pin extending into the groove in the adjacent ring, rollers sleeved one on each said pin and occupying the grooves in said rings, a slot in one of said rings, a pin rigid with the frame and extending into said slot, a handle rigid with said end cap, a handle rigid with said collar, a block integral with one of said rings, an arm carried by and rigid with said block, and means connected to said arm and actuated by said cam, said latter means comprising a second shaft having bearing in the frame, a lever rigidly secured intermediate of its ends to the second shaft, a roller journaled to one end of the lever and engaging said cam, an arm rigid with the second shaft, and a link connecting said arm with the arm carried by said block, a spring connecting the opposite end of said lever with a drum having bearing in the frame, and means for actuating the drum, a third shaft having bearing in the frame and threaded through a bracket therein, and carrying actuating means on one end thereof, the opposite end engaging an integral part of said lever, a bracket secured to the rear of the frame and adapted to carry an arm for holding a key-seating tool, a rod threaded through an integral boss on said bracket, slides having slots of width respecting the tool being used, slidable in a corresponding longitudinal groove in said table.

Signed at Hamilton, Province of Ontario, Canada, this fifth day of September, 1918.

HERBERT EMBREE.

Witness:
H. G. HINDRY.

Copies of this patent may be obtained for five cents each, by addressing the "Commissioner of Patents. Washington, D. C."